Figure 1:
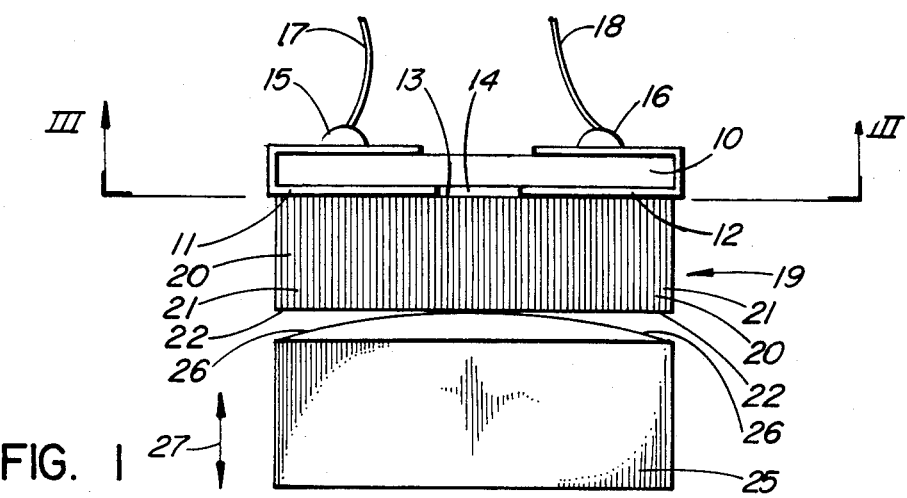

United States Patent [19]
Bannister et al.

[11] Patent Number: 4,651,122
[45] Date of Patent: Mar. 17, 1987

[54] MINIATURE ELECTRO-MECHANICAL TRANSDUCER FOR MEASURING LOADS AND DISPLACEMENT

[75] Inventors: Cecil H. Bannister, Kanata; Paul N. Ramsden; Loretino M. Latessa, both of Ottawa, all of Canada

[73] Assignee: Northern Telecom Limited, Montreal, Canada

[21] Appl. No.: 796,044

[22] Filed: Nov. 4, 1985

[51] Int. Cl.⁴ ............................................. H01C 10/00
[52] U.S. Cl. ...................................... 338/126; 338/125
[58] Field of Search ........................ 338/125, 126, 2-5

[56] References Cited

U.S. PATENT DOCUMENTS 2,494,998  1/1950  Guller ................................. 338/125
2,831,158  4/1958  Katz ................................. 338/126 X Primary Examiner—E. A. Goldberg
Assistant Examiner—M. M. Lateef
Attorney, Agent, or Firm—Sidney T. Jelly

[57] ABSTRACT

A miniature electro-mechanical transducer uses a body of elastomeric material composed of alternate layers of flexible dielectric material and flexible conductive material. The ends of the layers form opposite surfaces. An actuating member moves against one surface and the other surface contacts two spaced electrodes. The arrangement is such that a progressively increasing number of layers of conductive material are brought into an electrically parallel circuit between the electrodes.

14 Claims, 13 Drawing Figures

MINIATURE ELECTRO-MECHANICAL TRANSDUCER FOR MEASURING LOADS AND DISPLACEMENT

This invention relates to a transducer for measuring loads and displacement, and is particularly concerned with providing a very small transducer, electro-mechanical in operation, which is very simple and has a good signal output for minimum displacement. No moving contacts are necessary.

Various devices exist for measuring loads and/or displacement. Some are spring type devices which require relatively large movements. Others comprise lengths of resistor wire, usually in the form of a tight zig-zag, the resistance varying depending on stress applied to the wire. These require accurate positioning. Other devices have sliding contacts, which can cause errors in signals, and are not suitable small displacements.

The present invention makes use of a particular form of elastomeric material. The material consists of alternate layers of flexible dielectric and flexible layers of conductive material. A typical example is alternate layers of a conductive ink and dielectric, one example of a conductive ink being one containing finely divided silver. The thickness of the layers can vary considerably.

In the broadest aspect, an electro-mechanical transducer comprises a body of elastomeric material, the material having a plurality of alternate layers of flexible dielectric material and flexible conductive material; two electrodes positioned on one side of the elastomeric material and an actuating member on the other side of the elastomeric material, the two electrodes spaced laterally and the layers of the elastomeric material extending generally normal to a plane between the electrodes and the actuating member. Movement of the actuating member towards the electrodes brings an increasing number of layers of conductive material into a parallel circuitry between the electrodes. The elastomeric material may be mounted on a support member, the electrodes being between the elastomeric material and the support member. Alternatively, the elastomeric material can be mounted on the actuating member. The surface contacting the layers can be curved—convex—or the elastomeric material can be mounted on a curved surface.

Figure 2:
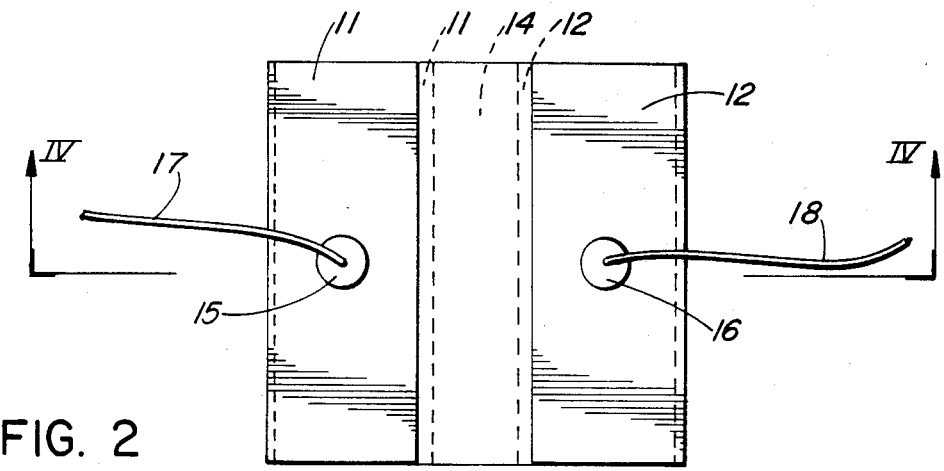
Figure 3:
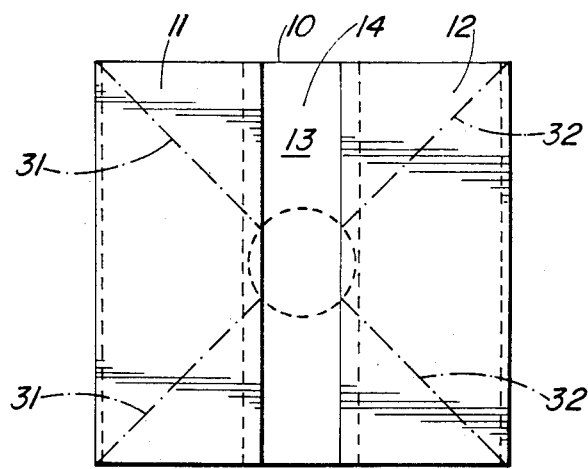
Figure 4:
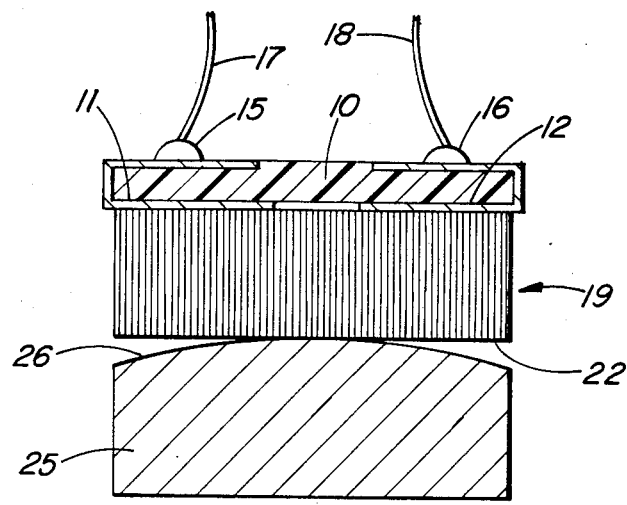
Figure 5:
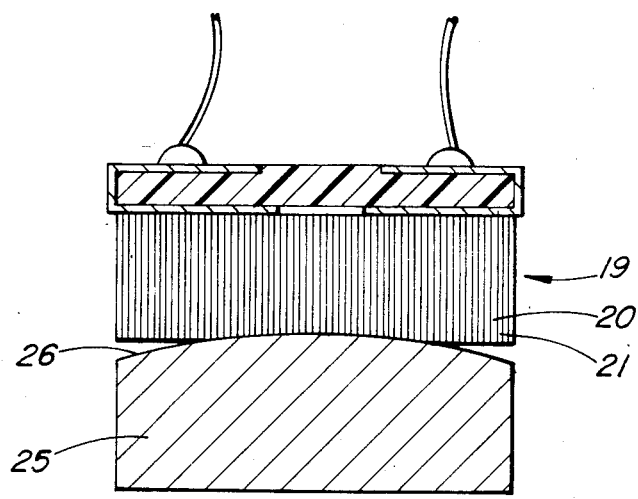
Figure 6:
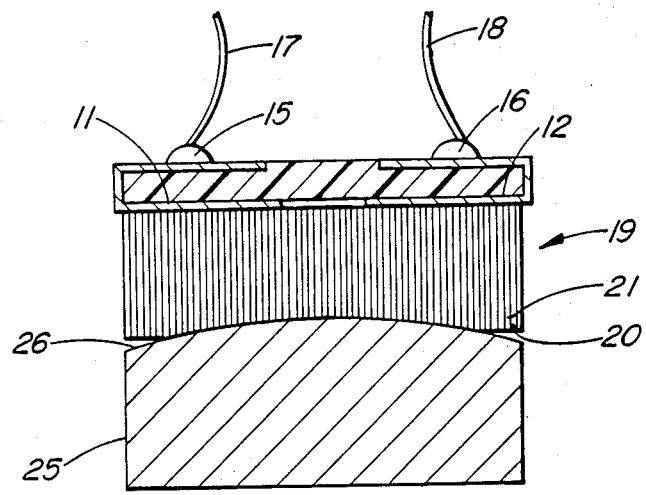
Figure 7:
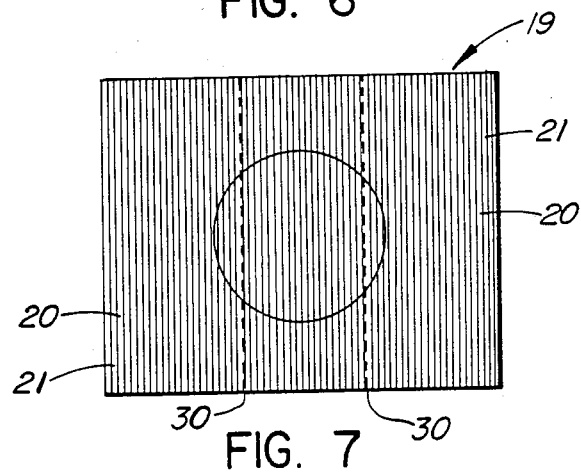
Figure 8:
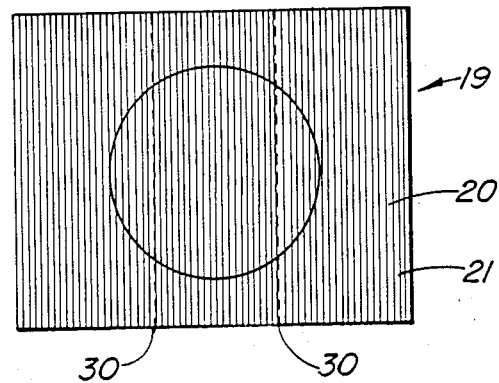
Figure 9:
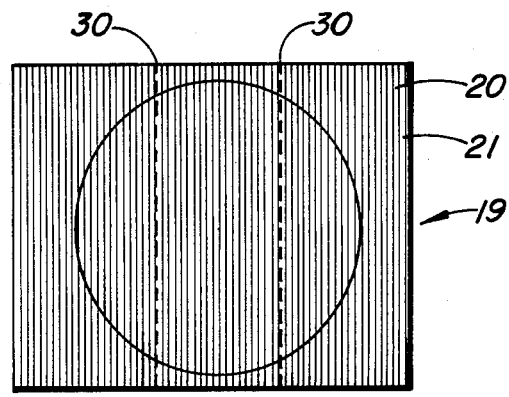
Figure 10:
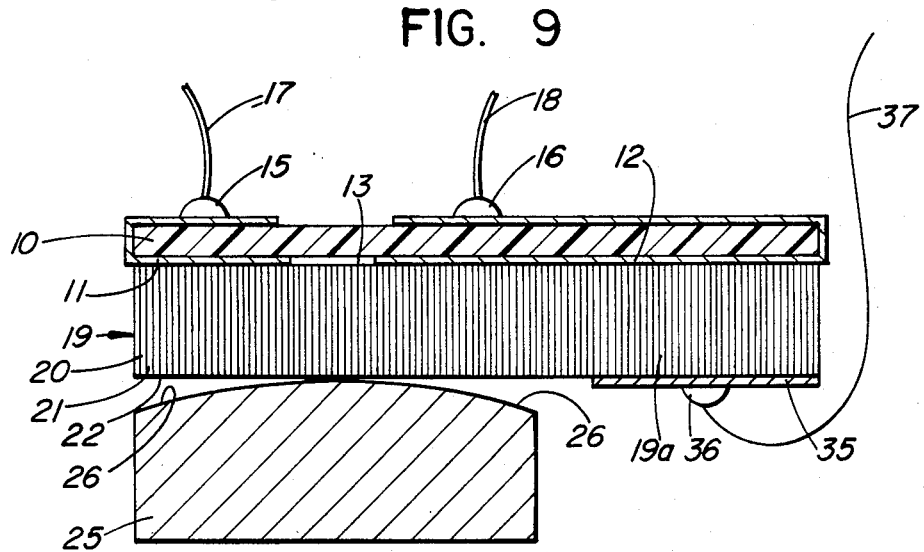
Figure 11:
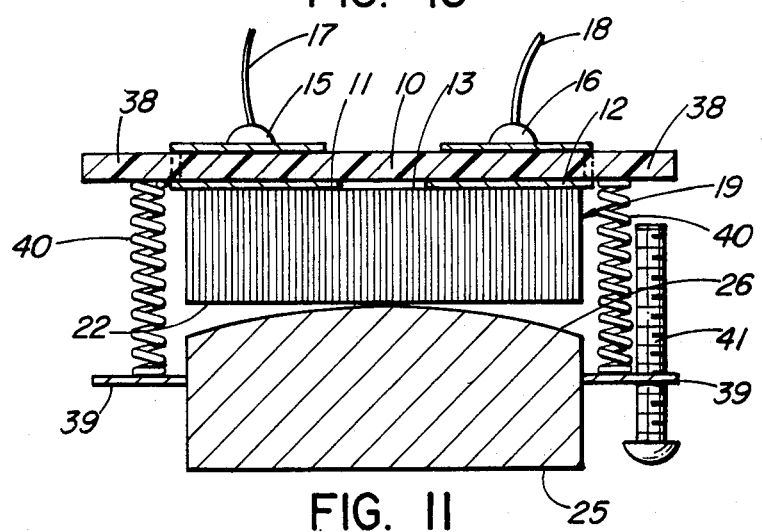
Figure 12:
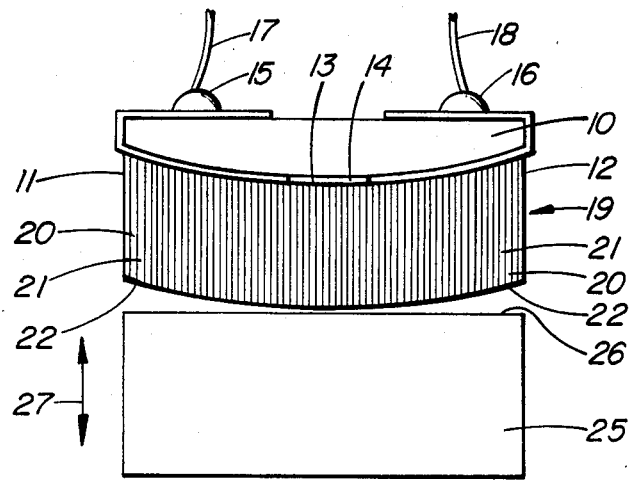
Figure 13:
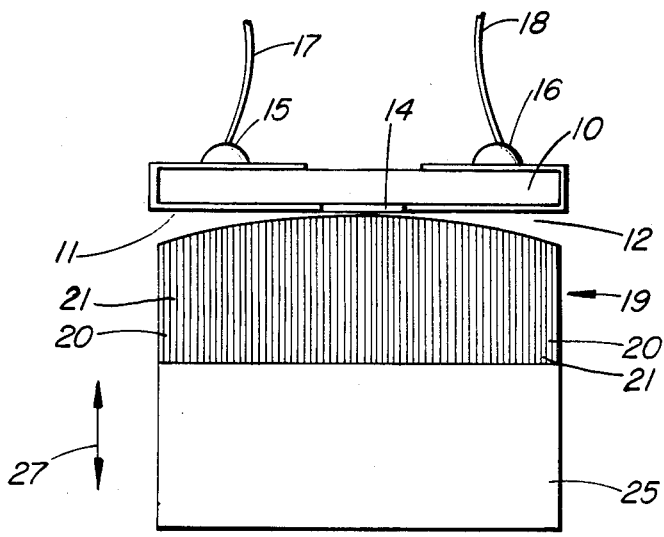

The invention will be readily understood by the following description of certain embodiments, by way of example, in conjunction with the accompanying drawings, which are to a considerably enlarged scale, in which:

FIG. 1 is a side view of one form of transducer;
FIG. 2 is a top plan view of the transducer of FIG. 1;
FIG. 3 is a cross-section on the line III—III of FIG. 1, showing the electrodes;
FIG. 4 is a cross-section, generally on the line IV—IV of FIG. 2, showing an initial contact condition;
FIGS. 5 and 6 are cross-sections similar to that of FIG. 4, showing two stages of progressive movement of an actuating member;
FIGS. 7, 8 and 9 are views on the bottom surface of the elastomeric material, illustrating the progressive increase in contact area on progressive movement of the actuating member;
FIG. 10 is a cross-section illustrating a further embodiment;
FIG. 11 is a further cross-section illustrating another embodiment;
FIG. 12 is a view similar to that of FIG. 1 illustrating an alternative embodiment; and
FIG. 13 is a further view similar to that of FIG. 1 illustrating a further alternative.

Illustrated in FIGS. 1, 2 and 3 is one form of transducer. A support member 10, of electrically insulating material, has two electrodes 11 and 12 formed on a support surface. The electrodes are spaced laterally, there being a small gap 14 between the electrodes. In the example, the electrodes 11 and 12 extend round the sides of the support member onto its other surface. Electrical connections are made to the electrodes at 15 and 16 via leads 17 and 18. A body of elastomeric material 19 is mounted on the support surface 13 and in contact with the electrodes 11 and 12. The elastomeric material is composed of a large number of layers comprising alternately a flexible dielectric layer and a conductive layer, indicated at 20 and 21. The layers extend generally normal to the support surface 13, the ends of the layers being exposed at a contact surface 22.

Opposed to the elastomeric material is an actuating member 25, having curved surface 26. In the example, the surface 26 is spherical. At least the surface 26 is electrically conducting. Conveniently the piston 25 is of conductive material. The actuating member moves in a direction normal to the support member, in a direction generally parallel to the layers 20, 21 as indicated at 27. An electrical input is applied via one of the leads 17 and 18, and an output taken from the other lead.

Initially, the actuating member can be positioned so that the surface 26 is not touching the elastomeric material. Alternatively it can be arranged that the surface 26 is in contact with the elastomeric material. If the diameter of contact is less than the distance of the gap 14, no output signal will be produced. If the area of contact is greater than the gap, then an initial signal will be produced. As the actuating member is moved into increasing contact with the elastomeric material, so the surface 26 moves into contact with a successively increasing number of conducting layers. Effectively, each layer acts as a resistor and increasing area of contact brings an increasing number of resistors into an electrically parallel relationship. The resistive path between input and output therefore decreases, giving an increasingly output signal. Also, in addition to the number of layers being contacted increasing, the length of contact between each layer and the surface 26—normal to the plane of the sheet in FIG. 1, also increases. The curve of the surface 26 will determine the curve of the output signal.

FIGS. 4 to 9 illustrate the initial contact between surface 26 and the elastomeric material (FIG. 4), two stages of progressive movement of the actuating member towards the elastomeric material (FIGS. 5 and 6) and three examples of increasing contact area between surface 26 and the elastomeric material (FIGS. 7, 8 and 9). The contact edges of the layers 20 and 21 are seen, the increase in number of layers contacted and the increasing length of contact with the layers. The spaced opposed edges of the electrodes 11 and 12 are indicated by dotted lines 30.

The curve of the output signal can be varied by varying the shape of the electrodes 11 and 12 where they are in contact with the elastomeric material. For example, the electrodes can be of decreasing width as they approach each other, as indicated by the chain dotted lines 31 and 32 in FIG. 3. Such variation of shape will modify the increase in length of contact between surface 26 and the layers 20 and 21 as the piston is moved. The shaping of the electrodes can provide for a linear output curve. The output signal can also be varied by varying the thickness of the layers 20 and 21. As an example, the total thickness of a compound layer, that is, a layer of flexible dielectric plus a layer of conductive material, can be 0.005 inches. This is the pitch of the layers. However, this dimension can be increased if desired.

As described above, the body of elastomeric material effectively acts as a plurality of resistors in parallel, for example, each layer 20 being a resistor. Increased contact between surface 26 and the elastomeric material increases the number of resistors in parallel. Also, the increasing length of contact with a layer effectively decreases the resistance of that layer. The output is normally connected into a bridge network, in series with a resistor of constant value, and an output signal abstracted in the normal manner from the bridge circuit. It can be arranged that the constant value resistor be part of the transducer assembly.

FIG. 10 illustrates an arrangement providing a constant value resistor. In the example, the body of elastomeric material 19 is extended laterally, at 19a, and an additional electrode 35 is attached to the surface of the portion 19a remote from the support member 10. The electrode extends over the width of the extra portion 19a also and terminal 16 and lead 18 are the input to the device. A further contact 36 is provided on the electrode 35 and a lead 37 extends from the contact 36. The main portion of the body of elastomeric material 19, contacted by the surface 26, becomes one branch of the bridge circuit and the further portion 19a becomes another arm of the bridge circuit.

Springs can be provided, in parallel with the actuating member, to take some of the load under high load conditions. This is illustrated in FIG. 11. The support member 10 is extended at each end, the extensions 38 being of reduced width relative to the main part of the support member. A projection 39 is attached on either side of the member 25 and springs 40 extend between the projections 39 and extensions 38. A limit stop can also be provided. This is shown in FIG. 11, a screw 41 extending in the projection 39 and adjustable to abut against the extension 38. A fixed stop can be provided alternatively.

It will be appreciated that the electrodes 11 and 12 need not be extended round onto the other surface of the support member 10. The support member can, for example, be extended laterally and the leads attached to the electrodes on the same surface as carries the elastomeric material.

While the invention has been described and illustrated with the elastomeric material supported on a flat, stationary support member, the invention can be applied in other ways.

Thus, as illustrated in FIG. 12, the support member 10 can have a curved support surface 13, for example spherical. The actuating member 25 can then have a flat surface 26. This can be a convenient arrangement for when the surface 26 is part of, or formed on, a moveable member of some apparatus. Both the support surface 13 and surface 26 can be curved.

A further alternative, illustrated in FIG. 13, has the elastomeric material mounted on the moveable or actuating member. Thus surface 26 becomes the support surface and contact is made between the elastomeric material and the electrodes 11 and 12, the layers moving sequentially into contact with the electrodes. While, in this example, the elastomeric material is shown mounted on a curved surface, the surface 26 can be flat and the electrodes 11 and 12 arranged to present a curved surface to the elastomeric material.

In yet another arrangement, the contact member 25 can be a thin flexible member extending over the contact surface 21. The surface 26 can then be pushed into contact with the contact surface by pressure on the flexible member. Various other arrangements can be visualized, whereby the exposed edges of the layers of conductive material are contacted by a conducting surface or member, to sequentially vary the number of conductive layers brought into an electrically parallel relationship.

The invention provides a simple and very small transducer. Thus, for example, with a layer pitch of 0.005 inches, the size of a transducer can be 3 mm $\times$ 3 mm $\times$ 5 mm and can give resistance changes from about $16 \times 10^3$ ohms to less than $0.44 \times 10^3$ ohms, with an actuating member displacement of about 0.4 mm. A typical elastomeric material is one sold by TECKNIT of Cranford, N.J., under the trademark Zebra. The device has an analogue output, requires no amplification, and has no moving contacts for obstructing the output signal. The invention has considerable use in robotics for measuring holding pressures and measuring small movements and similar features. It is also applicable in handwriting recognition devices for measuring pen pressures. In this example, the contact surface would be flexible.

The device can also be used as a switch if the initial area of contact is less than the gap 14 between electrodes.

What is claimed is:

1. An electro-mechanical transducer comprising:
   a body of elastomeric material composed of a plurality of alternate layers of flexible dielectric material and flexible conductive material;
   two electrodes on one side of said body of elastomeric material, the electrodes being spaced laterally about an axis and in opposition to ends of said layers on said one side;
   electrical connection to said electrodes, an input to one electrode and output to the other electrode;
   an actuating member on the other side of said body of elastomeric material and having at least an electrically conductive surface aligned with said axis and in opposition to ends of said layers on said other side;
   said alternate layers extending generally in a direction normal to a plane extending between said electrodes and said actuating member;
   movement of the actuating member towards said electrodes deforming said body of elastomeric material and successively connecting an increased number of layers of conductive material in parallel between said electrodes through said conductive surface.

2. A transducer as claimed in claim 1, including a support member, said electrodes and said elastomeric material being mounted on a surface of the support member.

3. A transducer as claimed in claim 1, said elastomeric material being mounted on said actuating member.

4. A transducer as claimed in claim 2, said elastomeric material having a planar contact surface extending generally normal to the direction of said layers, said actuating member having a convex arcuate surface opposed to said planar contact surface.

5. A transducer as claimed in claim 4, said actuating member having a spherical surface opposed to said planar contact surface.

6. A transducer as claimed in claim 2, said elastomeric material having a convex arcuate contact surface, said actuating member having a planar surface extending generally normal to the direction of said layers.

7. A transducer as claimed in claim 3, said elastomeric material having a convex arcuate contact surface and said electrodes extending in a plane generally normal to the direction of said alternate layers.

8. A transducer as claimed in claim 1, said electrodes having opposed inner ends, the electrodes being of constant width.

9. A transducer as claimed in claim 1, said electrodes having opposed inner ends, the electrodes being of variable width.

10. A transducer as claimed in claim 9, each of the electrodes decreasing in width from an outer end towards said inner end.

11. A transducer as claimed in claim 1, including a lateral extension of said elastomeric material, one of said contacts in contact with one surface of said lateral extension and a further electrode in contact with another surface of said lateral extension, the surfaces of said lateral extension spaced in a direction normal to the direction of the layers, said lateral extension forming a fixed resistance member.

12. A transducer as claimed in claim 1, said electrodes being mounted on a support member, and springs extending between said support member and said actuating member.

13. A transducer as claimed in claim 1, said electrodes being mounted on a support member, and adjustable stop means positioned between said support member and said actuating member.

14. A transducer as claimed in claim 1, including a support member having front and back surfaces, said electrodes mounted on said front surface and extending over side edges of the support member onto said back surface, and electrical connections on said electrodes at said back surface.

* * * * *